United States Patent
Lu et al.

(10) Patent No.: US 6,723,278 B1
(45) Date of Patent: Apr. 20, 2004

(54) METHOD OF LASER CASTING COPPER-BASED COMPOSITES

(75) Inventors: Li Lu, Singapore (SG); Jerry Ying Fuh, Singapore (SG); Yoke San Wong, Singapore (SG); Zhenda Chen, Singapore (SG); Gnian Cher Lim, Singapore (SG)

(73) Assignees: The National University of Singapore, Singapore; The Singapore Institute of Manufacturing Technology, Singapore ( * ) Notice: Subject to any disclaimer, the term of this patent is extended or adjusted under 35 U.S.C. 154(b) by 0 days.

(21) Appl. No.: 09/831,340

(22) PCT Filed: Nov. 10, 1999

(86) PCT No.: PCT/SG99/00116

§ 371 (c)(1),
(2), (4) Date: Jan. 31, 2002

(30) Foreign Application Priority Data

Nov. 12, 1998 (SG) .............................................. 9804031

(51) Int. Cl.[7] .................................................. B22F 7/02
(52) U.S. Cl. ..................... 419/6; 419/7; 419/9; 419/46; 419/47
(58) Field of Search .............................. 419/6, 7, 9, 46, 419/47

(56) References Cited

U.S. PATENT DOCUMENTS

| | | |
|---|---|---|
| 4,863,538 A | 9/1989 | Deckard |
| 4,938,816 A | 7/1990 | Beaman et al. |
| 4,944,817 A | 7/1990 | Bourell et al. |
| 5,076,869 A | 12/1991 | Bourell et al. |
| 5,104,748 A | 4/1992 | Mori et al. |
| 5,182,170 A | 1/1993 | Marcus et al. |
| 5,393,613 A | 2/1995 | MacKay |
| 5,431,967 A * | 7/1995 | Manthiram et al. .......... 427/555 |
| 5,658,412 A | 8/1997 | Retallick et al. |
| 5,730,925 A | 3/1998 | Mattes et al. |
| 5,732,323 A | 3/1998 | Nyrhila |
| 5,745,834 A * | 4/1998 | Bampton et al. .............. 419/37 |
| 5,753,274 A | 5/1998 | Wilkening et al. |

FOREIGN PATENT DOCUMENTS

WO    WO 92/08567 A1    5/1995

OTHER PUBLICATIONS

Van der Schueren, B. et al., "Powder deposition in selective metal powder sintering", Rapid Prototyping Journal, vol. 1. No. 3, 1995, pp. 23–31.

* cited by examiner

Primary Examiner—Daniel J. Jenkins
(74) Attorney, Agent, or Firm—Birch, Stewart, Kolasch & Birch, LLP

(57) ABSTRACT

This invention presents the process of direct laser casting of copper alloys: Cu—X (where X=Ni, Fe, W;) and their composites Cu—Y and Cu—X—Y (Y=WC, TiC, Ti+C) from powders prepared using mechanical mixing and ball milling processes. Since the metallic powder is combined with a low melting point Cu metal, which has good thermal and electrical conductivity, the combination allows the powder mixture to be melted by $CO_2$ laser and re-solidified into a part with good mechanical properties and conductivity. The laser casting process for the Cu-based in-situ formation and the material systems formed using the said method have been developed. The process can be used to fabricate complex three-dimensional objects by multi-layer overlapping and the material systems can be used to build rapid tooling due to the properties of good thermal conductivity and low wear rate.

32 Claims, 9 Drawing Sheets

METHOD OF LASER CASTING COPPER-BASED COMPOSITES

This application is the national phase under 35 U.S.C. §371 of PCT International Application No. PCT/SG99/00116 which has an International filing date of Nov. 10, 1999, which designated the United States of America.

FIELD OF INVENTION

This invention relates to a method of laser casting, for example, a copper-based material. In particular, the invention presents a method to directly melt pure copper (Cu) powder with the help of other elements (X) such as, for example, (nickel (Ni), iron (Fe) or tungsten (W)) using $CO_2$ laser. Using this technique, Cu alloys (Cu+X) and composites Cu–Y and Cu–X–Y (Y=tungsten carbide (WC), titanium carbide (TiC), titanium (Ti) and graphite (C)) can be synthesised from elemental powder mixtures which are prepared by mechanical mixing or milling processes. The developed laser casting process may advantageously be used to fabricate complex three-dimensional objects, by multi-layer overlapping, which may be used in electrical discharging machining (EDM) electrodes, rapid die and mould tooling, or other system components.

BACKGROUND ART OF THE INVENTION

The method and apparatus of selective laser sintering (SLS) are described in U.S. patents such as U.S. Pat. No. 4,863,538 (1989), U.S. Pat. Nos. 4,938,816 and 4,944,817 (1990), U.S. Pat. No. 5,076,869 (1991) and U.S. Pat. No. 5,182,170 (1993). In SLS, parts are built by selective sintering or local melting of a binder in a thin layer of powder particles using a $CO_2$ laser beam. The interaction of the laser beam with the powder raises the temperature to the melting point of the powder binder, resulting in particle bonding, fusing the particles to one another and to the previous layer. After an additional layer of powder is deposited via a roller mechanism on top of the sintered layer, the succeeding layer is similarly sintered and built directly on top of it. In this way, the entire solid can be built layer by layer. Each layer of the building process consists of the required cross-section of the part at a given height. The unsintered powder in each layer remains in the powder bed during processing to support overhangs and other structures in subsequent layers. The completed part is revealed by brushing off the loose powder surrounding it and the unsintered powder can then be reused. Despite of the capability of the SLS to build parts of various materials, post-processing, such as debinder and Cu infiltration, is often needed to achieve working strength. Shrinkage of the built part after the debinder and infiltration process results in distortion.

A selective metal powder sintering process was described by Van der Schueren and Druth in "Powder deposition in selective metal powder sintering" in Rapid Prototyping Journal, Vol. 1, Number 3, 1995, pp23–31. In this process particles in a Fe—Cu powder mixture were selectively bound by means of liquid phase sintering initiated by a Nd-YAG laser beam. The powder deposition mainly depended on the powder properties—in this case on the individual Cu or Fe powder properties—and resulted in compromises on the powder mixtures as well as in modifications of the deposition mechanism.

EOSINT M system, as described in U.S. Pat. Nos. 5,753,274, 5,730,925, 5,658,412, was the first commercial system for direct laser sintering of metallic powder. The word "direct" implies that the material constituents are directly laser sintered to produce a high density part requiring little or no post-processing. A related patent on parts formed by direct sintering is U.S. Pat. No. 5,732,323 which describes processing of powders based on an iron-group metal. Currently, the only metallic material that is available commercially for direct metal sintering is a bronze-nickel alloy by Electrolux and a newly developed metal powder M Cu 3201 by EOS. Direct selective laser sintering involves directly melting and consolidating selected regions of a powder bed to form a desired shape having high or full density. Direct metal laser sintering involves melting the component matrix and obtaining the appropriate amount of flow from the molten material. The appropriate amount of flow is critical and can be described as the flow that eliminates porosity, produces a highly dense part and maintains tight dimensional tolerances. The appropriate amount of flow is controlled by factors such as atmosphere, powder bed temperature and laser' energy density. Three important parameters governing the energy density are laser power, scan spacing and scan speed[2]:

$$A_n = P/v\delta (J/cm^2) \tag{1}$$

where $A_n$ is the energy density; P is the incident laser power (Watts); v is the laser scan speed (cm/s); and $\delta$ is the scan spacing (cm).

If the energy density is too high, the surface begins to vaporize before a significant depth of molten material is produced. The sintered layer thickness decreases with increasing scan speed due to the shorter interaction (sintering) time. This thickness also decreases with decreasing scan line spacing if the laser beam spot is larger than the spacing. More scan overlapping will occur with smaller scan line spacing. The thermal conductivity and reflectivity of the sintered solid are higher than those of the powder. When more scan overlapping occurs, more laser energy will be transferred away by heat conduction through the sintered solid and reflected away by the sintered solid surface resulting in a decrease in the layer thickness.

The amount of light energy of the laser beam absorbed by a metallic surface is proportional to 1-R, where R is its reflectivity. The reflectivity of a material is defined as the ratio of the radiant power reflected to the radiant power incident on the surface. It indicates the fraction of the incident light that is absorbed and contributes to heating effects, and is most dependent on the electrical conductivity. A metal with high electrical conductivity has high reflectivity, for example, copper and nickel. High-density energy is required to sinter a material with high reflectivity, such as Cu. Another important characteristic is thermal diffusibility. A material with high thermal diffusibility will normally allow a greater depth of fusion penetration with no thermal shock or cracking.

At the $CO_2$ laser wavelength of 10.6 μm, where R is close to unity, 1-R becomes very small. High-density energy is thus required to sinter a material like copper. The difference in the value of R becomes important at long wavelengths. For copper at 10.6 μm, 1-R is about 0.02, whereas for steel it is about 0.05. As steel absorbs 2.5 times as much of the incident light as copper, it is easier to melt steel with a $CO_2$ laser than metals such as aluminum or copper. Attempts to coat the powder surface to improve heat absorption or reduce reflection are not always effective because of poor thermal coupling between the coating and the powder. The reflectivity problem has been a barrier to the application of $CO_2$ lasers to the melting of metals such as copper or gold.

SUMMARY OF THE INVENTION

According to one aspect of the invention there is provided a method of laser casting a metal-based alloy or composite comprising:

milling elemental metal powder having a relatively high reflectivity at the wavelength of the laser with at least one other material which absorbs laser energy more readily than said elemental metal powder to form said metal-based mixture; and laser casting said metal-based mixture; wherein said milling is conducted for a period sufficient to form at least a partial coating of said at least one material on particles of said elemental metal powder.

More particularly the invention provides a method of laser casting a copper-based alloy or composite comprising:

milling elemental copper powder with at least one other material which absorbs laser energy more readily than elemental copper powder to form said copper-based mixture; and laser casting said copper-based alloy or composite by application of a laser to said copper-based mixture; wherein said milling is conducted for a period sufficient to form at least a partial coating of said at least one material on particles of said elemental copper powder.

DETAILED DESCRIPTION

Figure 1A:
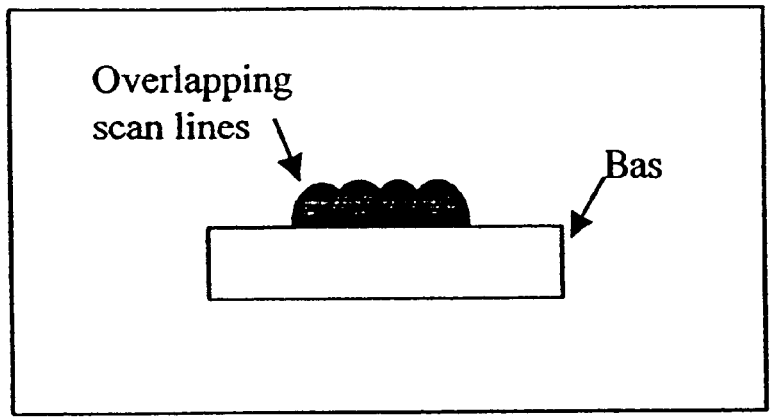
FIG. 1a illustrates a process of laser casting in building strips.

The following description of the invention will be limited to Cu based systems. However, it will be recognised that the principle of the invention may also be applied to other metal systems where the laser casting of a metal having high reflectivity is required.

Cu is a very versatile and common material for applications requiring good electrical and thermal conductivities, especially for use as a base material in EDM electrodes. However, Cu is not easily melted by $CO_2$ laser due to its high reflectivity to the laser. The present invention in one aspect advantageously provides a method of melting Cu using $CO_2$ laser with the help of other element(s) to form Cu alloys and Cu-based in-situ composites.

Elemental Cu powder is initially milled with other elemental powder or compounds which absorb laser energy more readily. To achieve a certain degree of coating of the second element on the Cu particles, the powder mixture is preferably ball milled for about 1 to 2 hours under the protection of Argon gas. The mills may be planetary ball mills, attritors and horizontal mills. Relatively high energy of milling is used. The coating on the Cu particles advantageously enhances the conduction of heat to the adjacent Cu particles. 0 to 3% by weight of process controlling agent (PCA), which can be, for example, stearic acid or other low melting organics and flux, may be used to prevent or minimize cold welding. If graphite is used, no PCA should be introduced in the milling. In general, minimal PCA should be incorporated into the powder mixture to reduce contamination.

Besides material compositions which will be discussed hereafter, the properties and quality of the part may be altered by altering the processing parameters, such as laser power output, beam spot size and its scanning speed. As such, these parameters are advantageously controlled in order to achieve optimal performance. In forming the particular material system and building the multi-layered parts, the processing parameters are preferably controlled to provide a laser power of 50–1000 W, beam spot size of 0.2–5.0 mm and laser scanning speed of 100–1500 mm/min.

In the laser casting process, inert gas such as Argon, is used to prevent oxidation of materials to be cast. When Ti is used, inert gas protection becomes more important. A reduction atmosphere of CO may also be used.

All powder systems are preferably mechanically mixed for at least about one hour followed by ball milling for at least about one to two hours to achieve at least partial coating of Ni, W, Fe, Ti, TiC or WC on the Cu particles. The ball mill machine is preferably run at a speed of 150–300 rpm using a ball size of 15–30 mm diameter with weight ratio of ball-to-particle-size of from 5–20:1 for a duration of from 1 to 4 hours. Up to 3% by weight of process controlling agent (PCA) may be added in the ball milling to prevent excessive cold welding. If C is used during milling, PCA should not be added to reduce surface contamination during milling.

Laser scanning speed preferably spans from 100 to 1500 mm/min using 50–1000 W laser power. Beam spot size generally ranges from 0.1–5.0 mm. These parameters should provide sufficient heat energy to melt the Cu component well. However, to build a fine layer part, the spot size can be further reduced and scanning speed increased. Inert gas of Argon is advantageously used during the laser scan. Due to the high reactivity of Ti with oxygen, an Argon chamber with purity of at least 99% is preferably used.

To obtain optimal parameters for a particular powder mixture, a stainless steel plate of approximately 5 mm thickness may be placed on a flat surface as a substrate. A 1 mm thick stainless steel plate with a central cut out is advantageously placed on top of a thicker plate. Metal powder is then preferably laid in the frame and lightly compressed and flattened by a roller in order to form a uniform powder bed. The laser beam is then programmed to scan the powder bed in horizontal strips, with each strip formed at a different laser scanning speed.

Figure 1B:
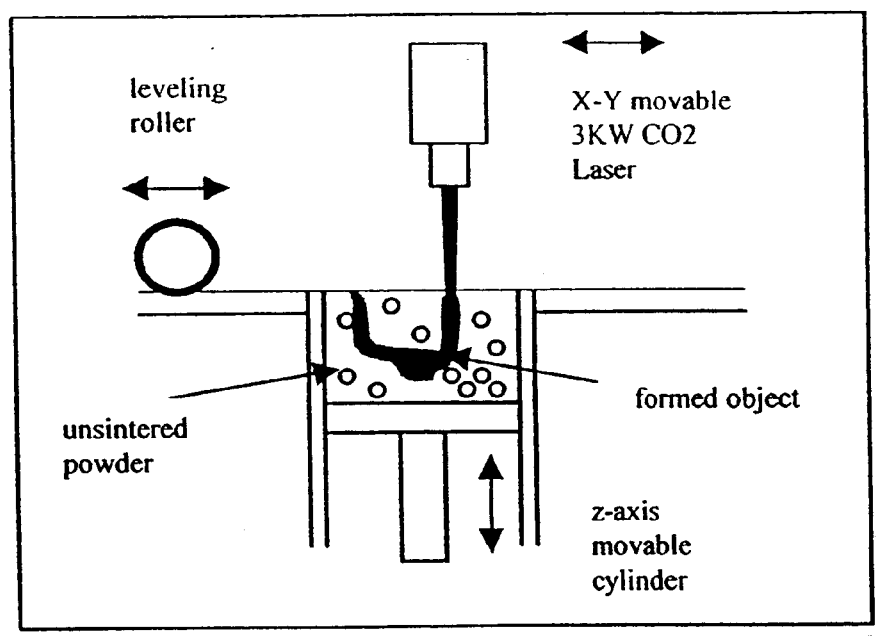
FIG. 1b illustrates the process of laser casting in a multi-layered part.

FIG. 1 illustrates the process of laser casting in building strips (FIG. 1a) and a multi-layered part (FIG. 1b). After the first layer of powder is scanned, the "piston" like part is lowered down and another layer of powder is spread on top of the preceding layer of powder. The uneven powder is slightly compressed and levelled using the levelling roller. The new layer of powder is then scanned by the laser. This process is repeated until a three-dimensional part is built.

In the laser scanning process of a Cu—Ni system, chemical homogenisation between the Cu and Ni occurs to form a homogeneous melt. The new homogeneous solid phase thus formed is Cu—Ni. The amount of Ni in the solid phase is preferably at least 5%. Even using a low percentage of Ni, the powder may still be laser-cast to form a dense part. A study of microstructure of the Ni—Cu system reveals a dendritic structure. It has been determined that as the amount of Ni is decreased from 57.5% to 9.59%, the dendritic microstructure progressively disappears.

In Cu—Ti—C, Cu—Ni/Ti—C systems, Cu and a mixture of Cu and Ni are used as the matrix while Ti and C react with each other to form in-situ TiC as reinforcement. The formation of fine hard TiC particles increases the strength, Young's modulus and wear resistance of the part produced. The maximum volume percentage of TiC is generally 50%.

In Cu—Ni/TiC systems, TiC is incorporated into a Cu—Ni matrix by laser casting the Cu—Ni together with TiC particles. It has been observed that the TiC is uniformly distributed in the Cu—Ni solid solution. The resulting microstructure shows good interface between the reinforcement phase and the matrix phase.

Cu/WC and Cu—Ni/WC composite parts may be synthesised using Cu/WC, Cu—Ni/WC systems. Cu can be melted with or without the help of Ni. WC may also be used to facilitate heat absorption and the melting of Cu. Since WC is much heavier than Cu and Cu—Ni solution, WC particles usually settle down to the bottom of the laser scanned line or strip. To minimize or prevent inhomogeneity in this case, thin laser scan lines are advantageously used.

Cu—Fe systems are also available using the present method. In this case at least 10% of Fe is preferable used for successful laser casting. More Fe may enhance formability of parts but will decrease electrical and thermal conductivities. Depending on applications, the amount of Fe may be varied from 10% to 50%.

When considering a Cu—W (Ni) system, about 10% W is preferably used to ensure successful laser casting. Since Cu and W are not solutable, Cu may be pushed to the two sides of the laser cast melt line. A thin laser cast line may help to reduce inhomogeneity of distribution of Cu in this case. Addition of Ni advantageously increases the wetting between the three constituents.

EXAMPLES

The following examples illustrate embodiments of the invention only and should not be construed as limiting on the invention in any way.

Example 1

Cu—Ni system

Figure 2:
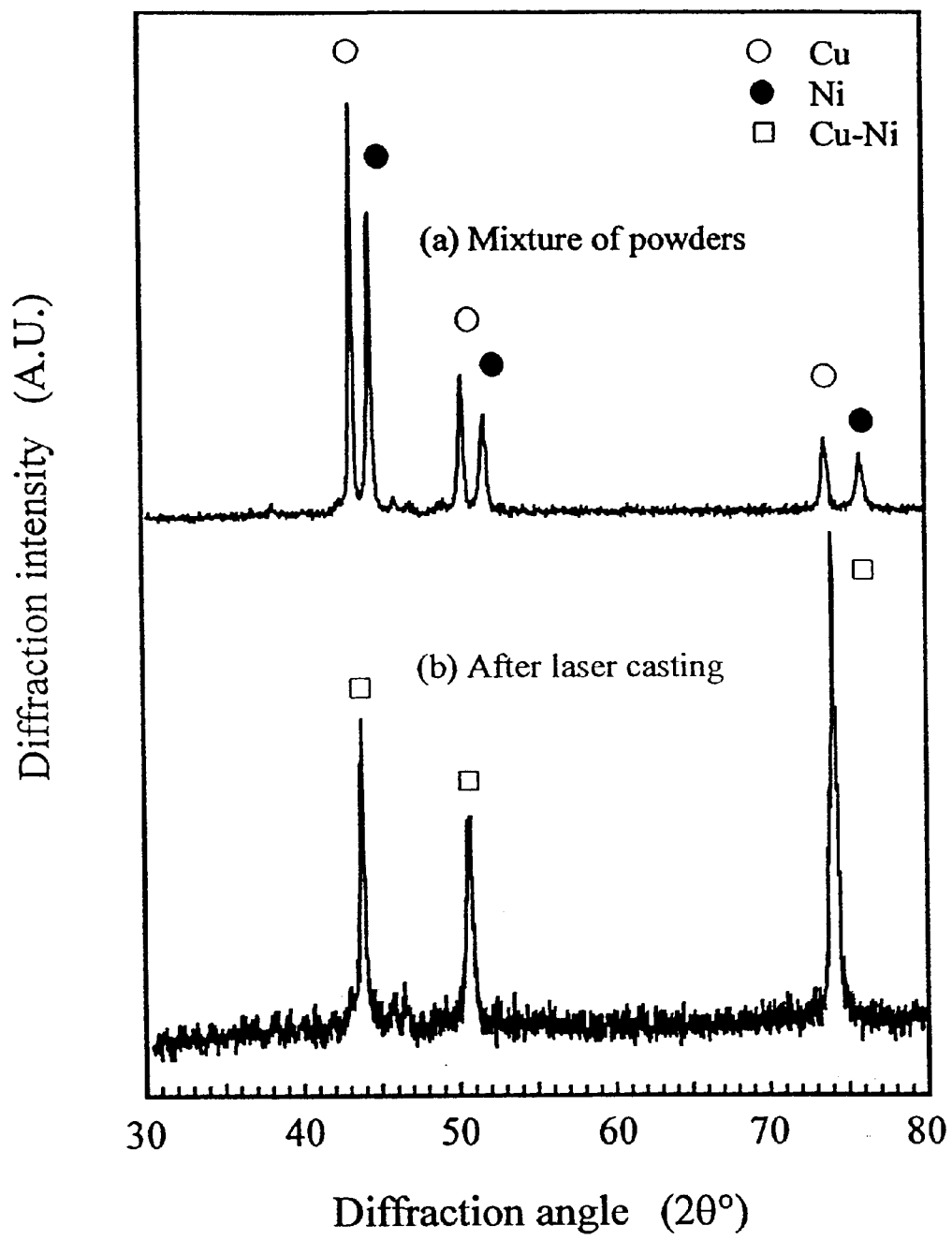
FIG. 2 shows an x-ray diffraction (XRD) results of Cu-Ni powder before and after the laser casting process.
Figure 3A:
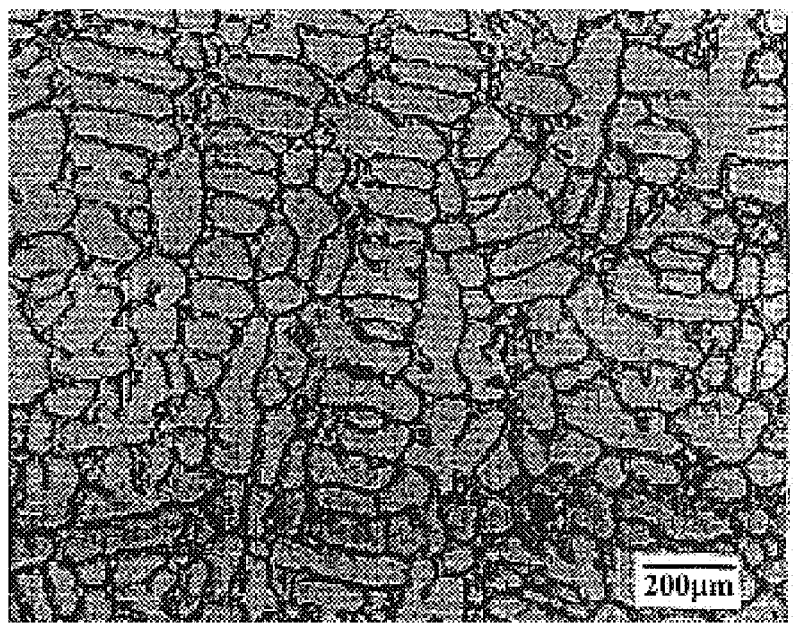
FIG. 3a shows the microstructure of the laser cast Cu-Ni material.
Figure 3B:
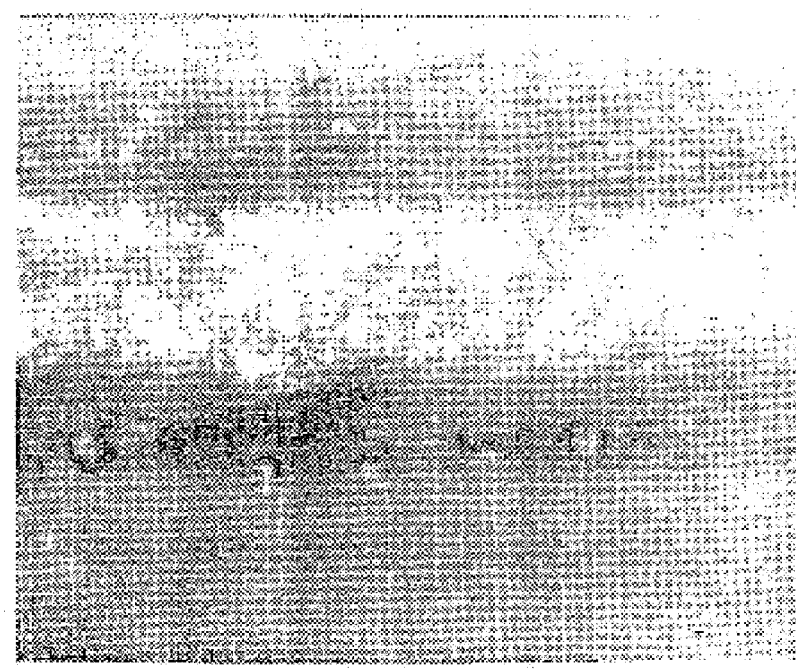
FIG. 3b shows a laser-cast tracking having smooth surface morphology.

For the Cu and Ni powder system, the percentage of Ni was varied from 10% to 67% by weight. The powder mixture was first ball milled to form a powder mixture. After ball milling, laser casting was carried out. Formation of Cu—Ni solid solution was observed. Even at low percentages of Ni, the powder mixture could still be melted and formed into a dense part. The Cu—Ni powder system was therefore used as the matrix for Cu alloy based composites. FIGS. 2a and 2b show the X-ray diffraction (XRD) analysis results of the Cu—Ni powder system before and after the laser casting process. FIG. 2a shows the as-received Cu—Ni XRD spectrum where Cu and Ni diffraction peaks can be seen. After laser casting, pure Cu and Ni peaks disappeared and a new solid solution of Cu—Ni phase was detected. Microstructure of the laser cast Cu—Ni material is shown in FIG. 3a. Even at low percentage of Ni, a homogeneous phase has been formed without porosity. As can be seen in FIG. 3b, the laser-cast track has a smooth surface morphology.

Example 2

Cu—WC (Ni) system

Figure 4:
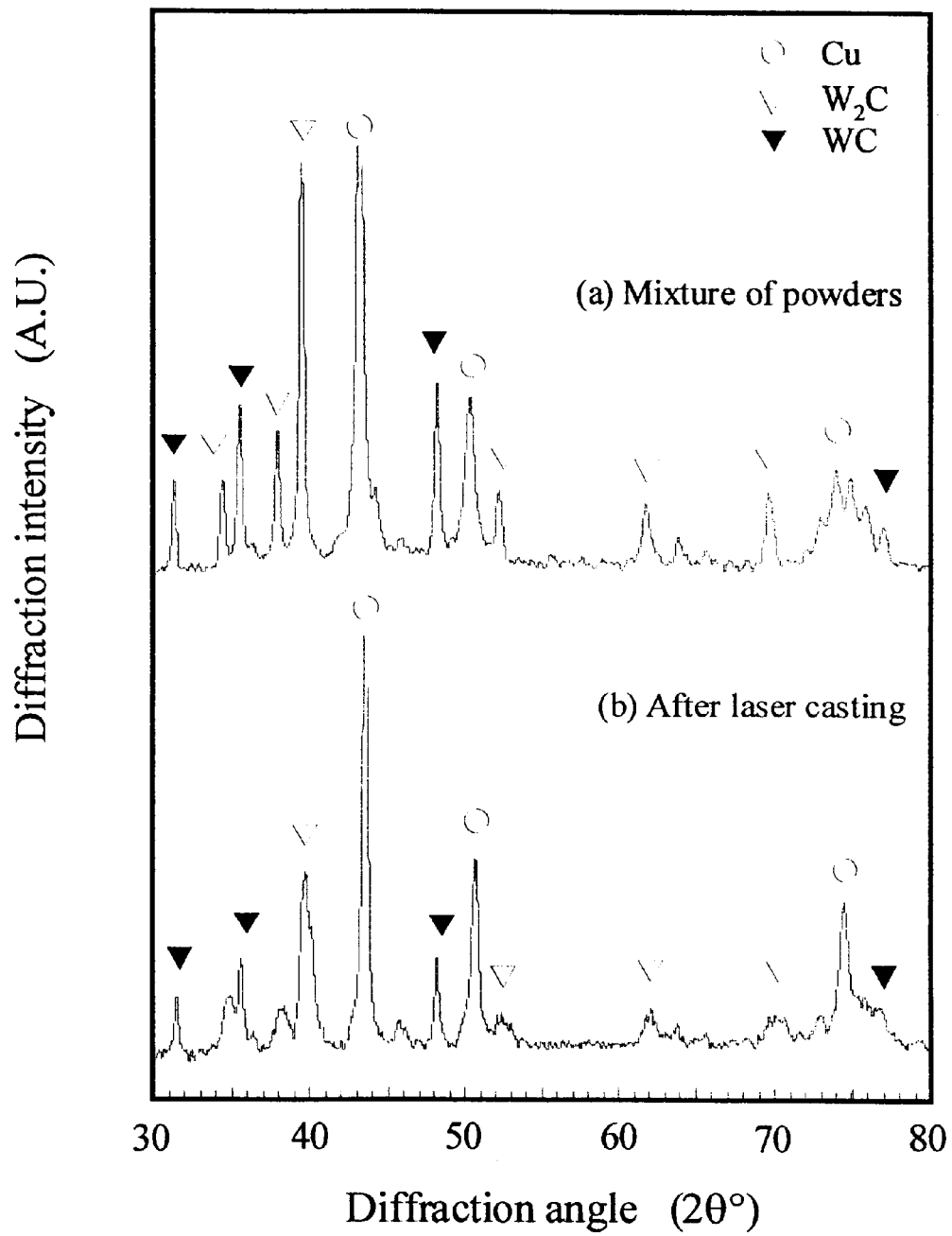
FIG. 4 shows the x-ray (XRD) diffraction spectra of a Cu-WC(Ni) system before and after laser casting.
Figure 5A:
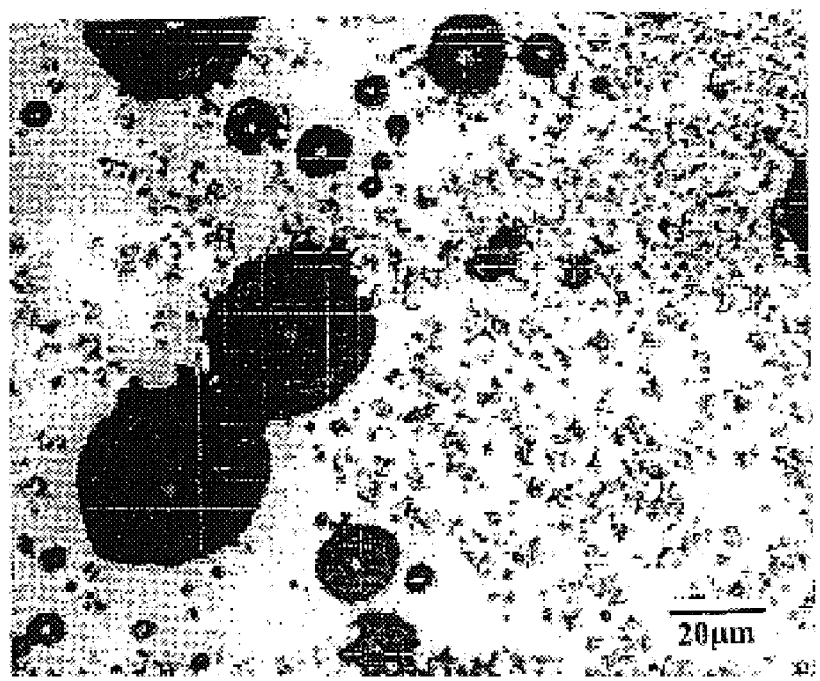
FIG. 5a shows the microstructure of the laser cast Cu-6.7% WC composite.
Figure 5B:
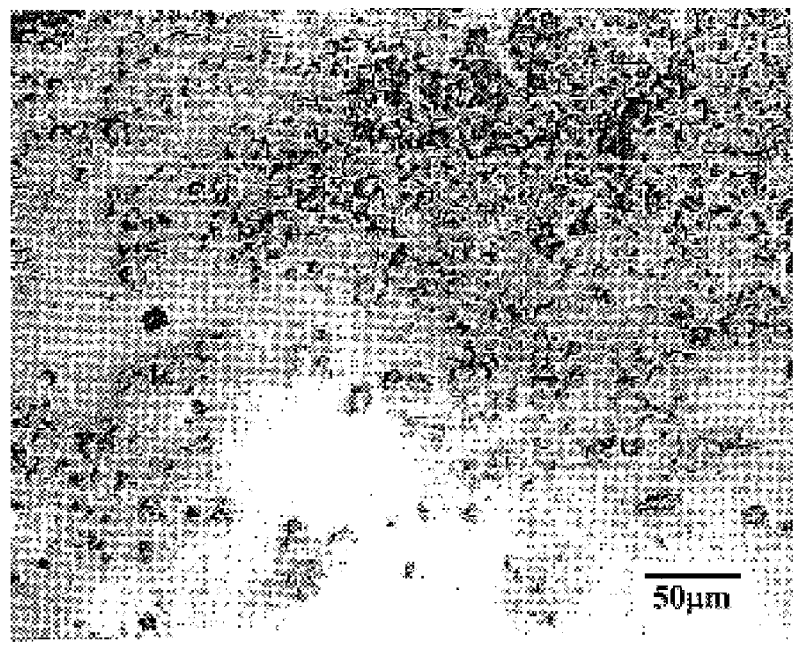
FIG. 5b is a photomicrograph showing the segregation of WC particles.
Figure 5C:
FIG. 5c shows the cross-section of a multi-layered part with CU 19.13% Ni 7.5% WC.

Cu was first ball milled with WC (with small amount of $W_2C$ in the WC powder). Between 10% to 60% by weight of WC was used in the process. Structural analyses using X-ray diffraction before and after laser casting are shown in FIGS. 4a and 4b. X-ray diffraction spectra show no structural change after laser casting. Microstructure studies indicate porosity in the laser cast part when the powder mixture contains less than about 10% by weight of WC. FIG. 5a shows the microstructure of the laser cast Cu-6.7% WC composite. Porosity in the cast part can be seen in the figure. With increasing percentage of WC, porosity can be reduced. With the addition of Ni into the powder system (Cu—Ni matrix), the porosity was eliminated and a highly dense part of WC particles embedded in a solid solution of nickel in copper was formed. Ni addition can increase bonding between Cu and WC. The microphotograph in FIG. 5b shows that WC particles segregate at the boundaries of the cast layers. During laser casting, the heavy WC particles sank to the bottom resulting in the segregation of the WC particles. FIG. 5c shows the cross section of a multi-layered part with Cu19.13% Ni7.5% WC. The microstructure reveals high density with no porosity after the addition of elemental Ni. The boundary between layers has slightly less WC due to remelting of the previous layer.

Example 3

Cu—Ti—C (Ni) system

Figure 6:
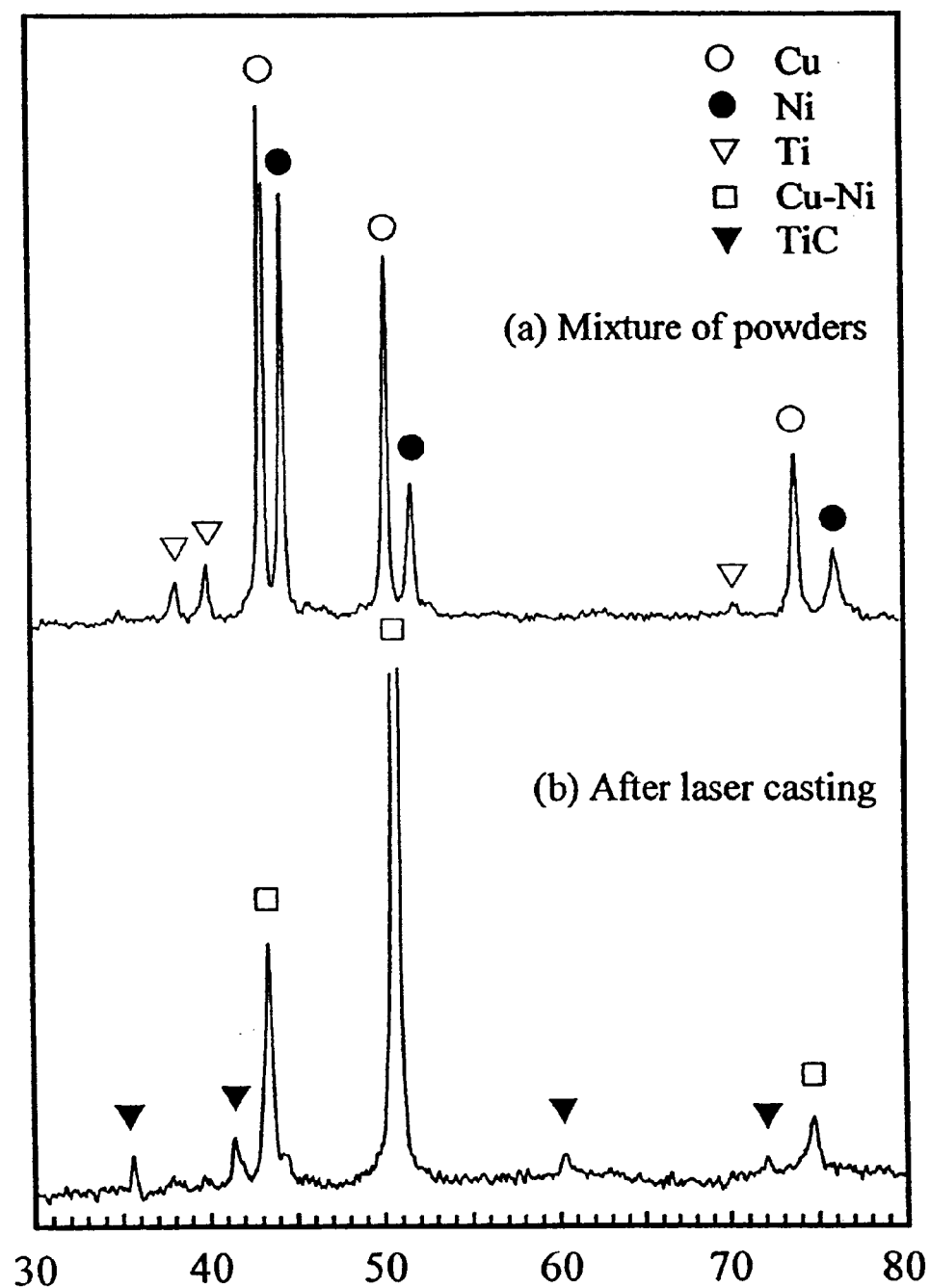
FIG. 6 shows an x-ray diffraction (CRD) spectrum of a CU-Ti-C(Ni) system comparing mixture of powders to after laser casting.
Figure 7A:
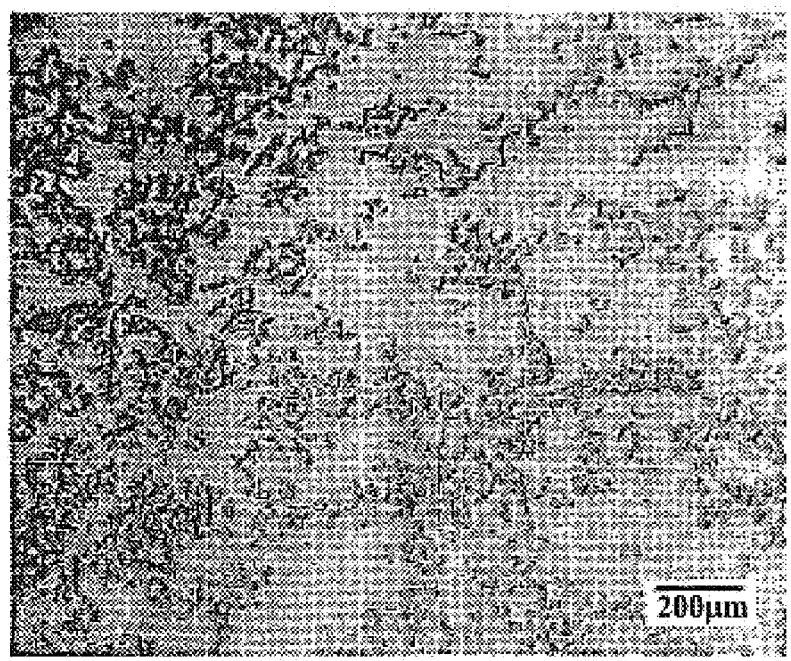
FIG. 7a shows the dense microstructure of the Cu-Ti-C-Ni system.
Figure 7B:
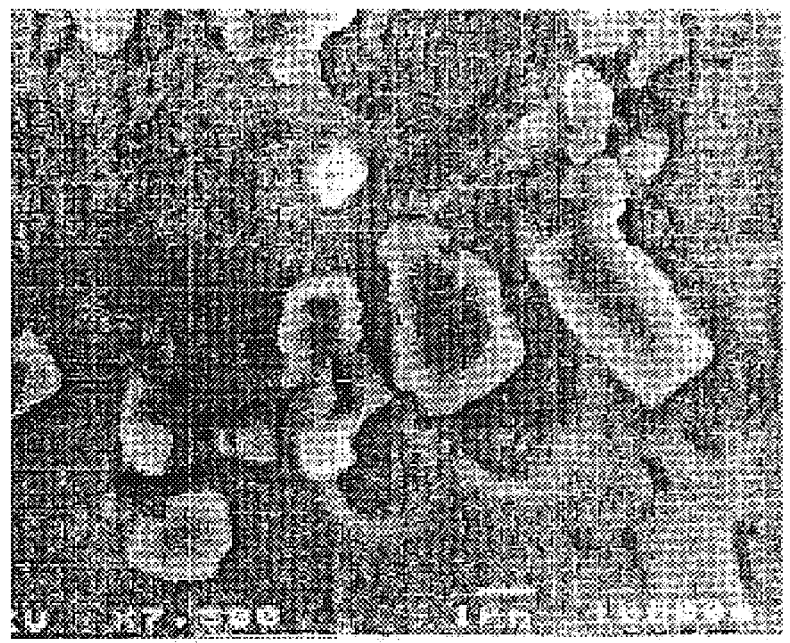
FIG. 7b is another view of the microstructure of the Cu-Ti-C-Ni system.

Laser casting of Cu—Ti—C (Ni) should be well protected to avoid oxidation of Ti powder since it is very reactive. Besides the use of an Argon chamber, direct purging with Argon gas is also possible. In-situ formation of TiC was observed in Cu—Ti—C systems as shown in FIG. 6. The formation of in-situ TiC can be observed from the TiC diffraction peaks, as shown in FIG. 6b. After the laser scan, Ti and C reacted completely with each other and no Ti was detected from the XRD results. Microstructure analysis showed that TiC was well distributed in the matrix. However, the part formed after laser casting was found to be relatively porous. At high percentages of Ti and C (calculated resultant 50% TiC) in the powder mixture of Cu—Ti—C, the powder did not fuse together after the laser sintering process. With the addition of Ni (at about 10%), the powder fused together to form a part with low porosity. FIG. 7 shows the dense microstructure of the Cu—Ti—C—Ni system.

Example 4

Cu—Ni—TiC system

Cu, Ni and TiC were ball milled to form a mixture. After ball milling, TiC particles were in general embedded in a solid solution of Cu in Ni matrix. Laser casting was carried out using the method as described above. Good particle-matrix interface after casting was observed. Unlike Cu—WC system, no segregation of TiC was observed. The multi-layered structure obtained showed a homogeneous distribution of TiC in Cu—Ni matrix.

Example 5
Cu—Fe

Figure 8:
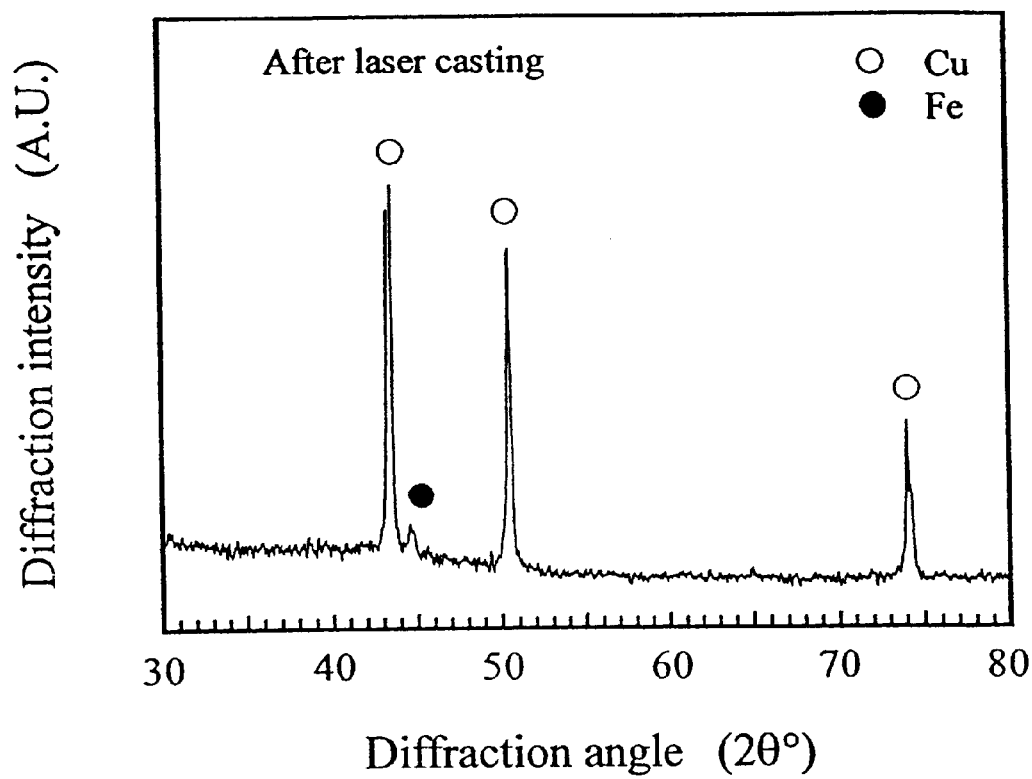
FIG. 8 shows the x-ray diffraction (XRD) spectrum of laser cast Cu 10% Fe.

Cu and Fe can be co-melted. The minimum amount of Fe used for the laser scan should be at least about 10%. If Fe content is less than 10%, it may lead to a porous structure and agglomeration of Cu. FIG. 8 shows the XRD spectrum of the laser cast Cu10% Fe. Although Cu—Fe system does not form compound, they are well mixed. Less than 10% Fe may cause difficulty in the melting of Cu and cause of agglomeration of Cu melts. Slight amount of Ni may help to increase wetability.

What is claimed is:

1. A method of laser casting a copper-based alloy or composite comprising:
   milling elemental copper powder with at least one other material which absorbs laser energy more readily than elemental copper powder to form a copper-based mixture; and
   laser casting said copper-based alloy or composite by application of a laser to said copper-based mixture; wherein said milling is conducted for a period sufficient to form at least a partial coating of said at least one material on particles of said elemental copper powder.

2. The method according to claim 1, wherein said milling step comprises ball milling said powder mixture for a period of from about 1 to 4 hours.

3. The method according to claim 1, wherein said milling step comprises mechanically mixing said powder mixture for a period of at least about 1 hour and subsequently ball milling said powder mixture for a period of about 2 hours.

4. The method according to claim 2, wherein said ball mill is run at a speed of from about 150 to about 300 rpm using a ball size of from about 15 mm to about 30 mm diameter.

5. The method according to claim 2, wherein the weight ratio of ball to powder is from 5–20:1.

6. The method according to claim 1, wherein said at least one other material comprises elemental Ni.

7. The method according to claim 6, wherein said Ni is present in an amount of at least about 5% by weight.

8. The method according to claim 1, wherein said at least one other material comprises elemental Ti and C.

9. The method according to claim 8, wherein said at least one other material further comprises elemental Ni.

10. The method according to claim 8, wherein the amount of Ti and C in said mixture are such that during said laser casting step, said Ti and C react with each other to form in situ TiC in an amount of 50% by weight or less, and wherein said Ni is present in an amount of about 10% by weight.

11. The method according to claim 1, wherein said at least one other material comprises TiC and elemental Ni.

12. The method according to claim 1, wherein said at least one other material comprises WC.

13. The method according to claim 12, wherein said WC is present in an amount of from about 10% to 60% by weight.

14. The method according to claim 12, wherein said at least one other material further comprises elemental Ni.

15. The method according to claim 12, wherein said at least one other material further comprises elemental W.

16. The method according to claim 1, wherein said at least one other material comprises elemental Fe.

17. The method according to claim 16, wherein said Fe is present in an amount of at least about 10% by weight.

18. The method according to claim 17, wherein said Fe is present in an amount of from about 10% to 50% by weight.

19. The method according to claim 16, wherein said at least one other material further comprises Ni.

20. The method according to claim 1, wherein said at least one other material comprises elemental W or Ni.

21. The method according to claim 20, wherein said W is present in an amount of about 10% by weight.

22. The method according to claim 1, wherein process controlling agent is added in said milling step in an amount to substantially prevent cold welding of particles of said mixture.

23. The method according to claim 22, wherein said process controlling agent is added in an amount of up to about 3% by weight.

24. The method according to claim 1, wherein the laser applied to said mixture during said laser casting is a $CO_2$ laser with a wavelength of 10.6 $\mu$m.

25. The method according to claim 24, wherein said laser is selectively applied to said mixture at a laser scanning speed of from 100 to 1500 mm/min.

26. The method according to claim 24, wherein said laser is applied at a laser power of from about 100 to about 1500 W using a beam spot diameter of from about 0.2 to about 5.0 mm.

27. The method according to claim 1, wherein said laser casting step is carried out under an inert atmosphere of argon gas.

28. The method according to claim 1, wherein said laser casting is carried out under a 10 reduction atmosphere of CO.

29. An article cast using a method according to claim 1.

30. The article according to claim 29, comprising a single-layer or multi-layer structure.

31. The article according to claim 29, wherein said article is an EDM electrode, rapid die and moulding tooling or system composites.

32. A method of laser casting a metal-based alloy or composite comprising:
   milling elemental metal powder having a relatively high reflectivity at a wavelength of the laser with at least one other material which absorbs laser energy more readily than said elemental metal powder to form a metal-based mixture; and
   laser casting said metal-based allay or composite by application of a laser to said copper-based mixture; wherein said milling is conducted for a period sufficient to form at least a partial coating of said at least one material on particles of said elemental metal powder.

* * * * *